June 2, 1936.  S. R. PUFFER  2,042,550
SUPERCHARGER FOR INTERNAL COMBUSTION ENGINES
Filed July 19, 1935
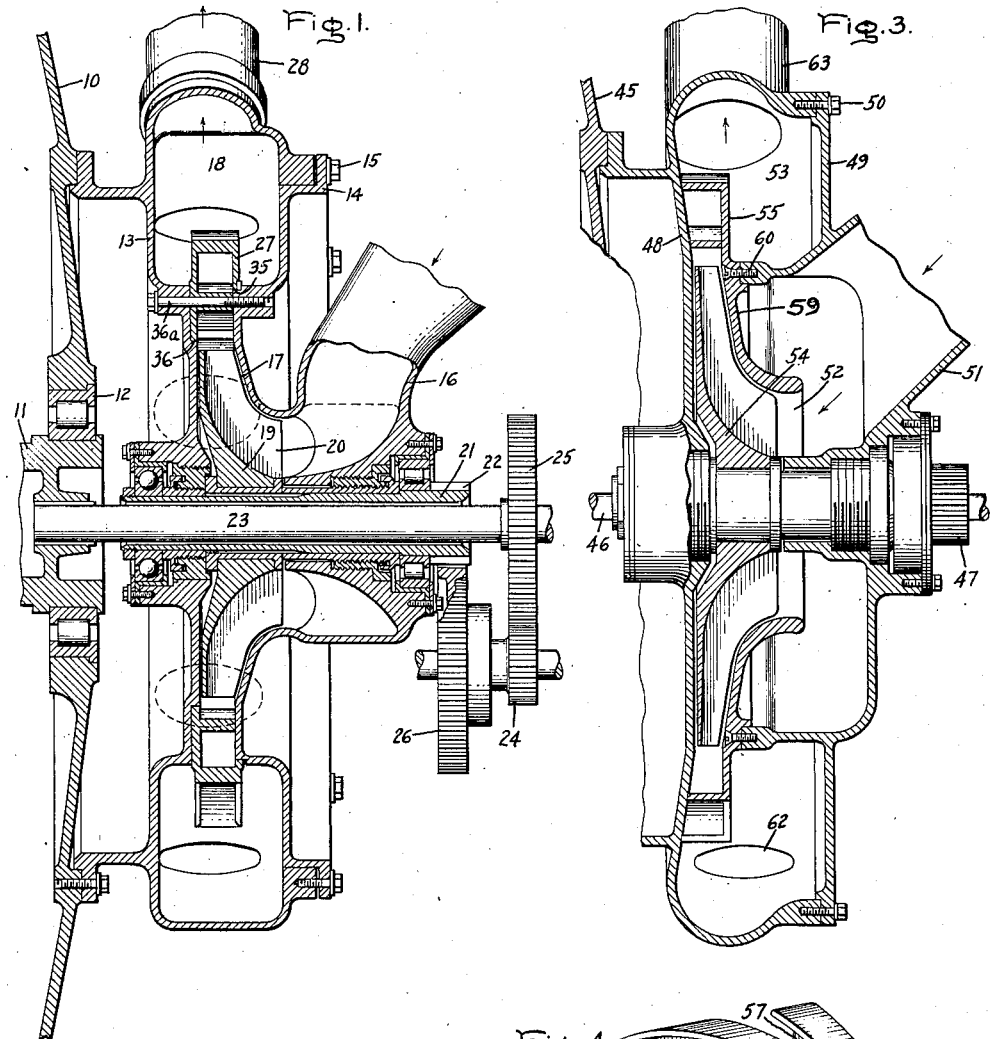
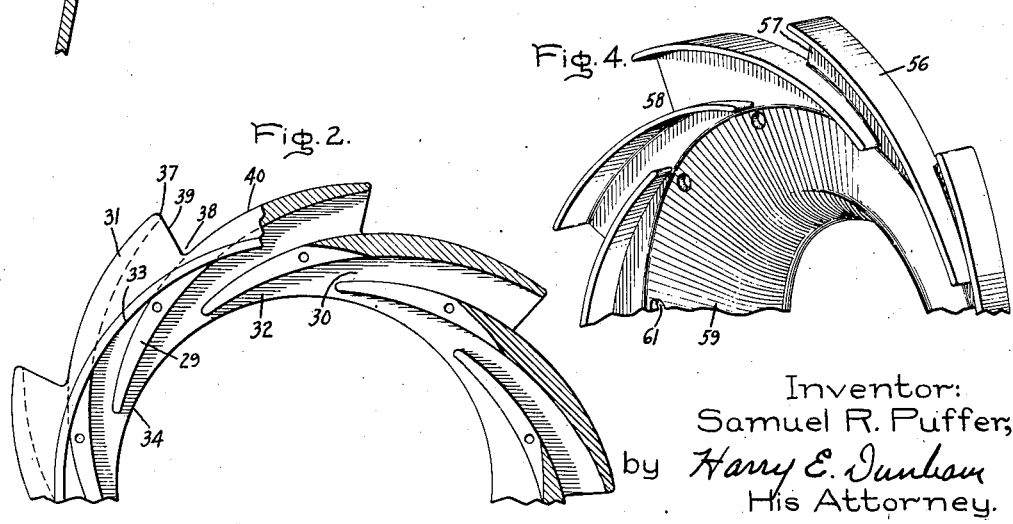
Inventor:
Samuel R. Puffer,
by Harry E. Dunham
His Attorney.

UNITED STATES PATENT OFFICE 2,042,550

SUPERCHARGER FOR INTERNAL COMBUSTION ENGINES

Samuel R. Puffer, Saugus, Mass., assignor to General Electric Company, a corporation of New York Application July 19, 1935, Serial No. 32,207

6 Claims. (Cl. 230—127)

The present invention relates to superchargers for internal combustion engines, more specifically to the centrifugal type of compressors or superchargers which include an impeller rotatably disposed in an impeller chamber for forcing air radially outward into a scroll or collecting passage. These compressors also include a diffuser concentrically spaced about the impeller for converting velocity energy imparted to a fluid, such as air, into pressure energy. In certain cases, especially where superchargers are provided in connection with aircraft, they must be made light in weight and their dimensions accordingly must be reduced to a minimum. Particularly is this true with respect to the scroll or collecting chamber which in an aircraft arrangement is connected at different points to the cylinders of an internal combustion engine. In the case of a nine-cylinder engine the outer portion of the collector passage is connected to nine conduits, preferably uniformly spaced along the circumference of the collector passage for conducting air or a mixture of air and fuel to the cylinders of the combustion engine. In the case of a four-cycle nine-cylinder radial engine, ignition in the different cylinders occurs in the order of 1, 3, 5, 7, 9—2, 4, 6, 8, cylinder #1 being usually located on the top vertical center. A complete cycle in such engine takes place during two complete revolutions or 720 angular degrees rotation of the engine crank shaft. The supercharger for furnishing air to the different cylinders must be designed to deliver fluid at a uniform rate and furnish an equal amount of air or mixture of air and fuel to each cylinder. The actual discharge of fluid, however, occurs intermittently at a very rapid rate, the point of discharge traveling around the collector passage in the direction of the firing order of the cylinders in order to supply the intake valves as they open in turn.

Usually the air-intake valve of each cylinder is open for approximately 220 angular degrees of a revolution, during which period all of the air used must enter the cylinder. It is important to note that since the duration of valve opening is greater than the interval between successive valve openings, simultaneous supply of air takes place to at least two and frequently three alternately adjacent valves for a certain period of the total valve opening time. Thus, while the intake valve to cylinder #1, in the above example is wide open, the intake valve to cylinder #8 is closing and the intake valve to cylinder #3 is starting to open. For this reason cylinder #3 is deprived by cylinders #1 and #8 of much of its air supply obtained from the normal flow of the air in the collector passage. Now, due to this fact, as outlined below the direction of flow of air through the collector passage or chamber of the supercharger is intermittently changed with respect to the different cylinders. Assuming the normal air flow through the collector passage takes place in clockwise direction, and also assuming a condition during which the air-intake valve for cylinder #8 is closing and the air-intake valve for cylinder #1 is open, then the air flowing to the connections with cylinders #8 and #1 along the path defined within the collector passage is substantially entirely discharged through said connections. Now, when the air-intake valve for cylinder #3 opens, its normal supply of air is already being taken by cylinders #8 and #1. Therefore, any air obtained by cylinder #3 during the early part of the stroke must come from that section of the collector passage lying beyond cylinder #3 in the direction of rotation. This can only be accomplished by causing a complete reversal of the direction of flow of air beyond cylinder #3. As stated above, in certain cases where superchargers are used in connection with aircraft, the collector passages and scrolls are of small dimension, resulting in high velocity of the air flowing therethrough and rapid reversal of flow.

In other words, the air discharged from an aircraft supercharger is not as uniform and unidirectional as is the case in the conventional type of compressor. The air discharge in an aircraft supercharger is intermittent, taking place at different points along the circumference of the air collector and accompanied by sudden reversals of the direction of flow at least along a part of the collector.

The general object of my invention is to provide an improved construction of superchargers whereby the aforementioned drawbacks in connection with aircraft internal combustion engines are greatly reduced.

A specific object of my invention is to provide an improved diffuser for compressors used for supercharging aircraft whereby uniformity in the flow of air through the scroll and to the engine cylinders is obtained.

For a consideration of what I believe to be novel and my invention, attention is directed to the following description and the claims appended thereto in connection with the accompanying drawing.

In the drawing, Fig. 1 illustrates a sectional view of a built-in supercharger in connection with an aircraft combustion engine; Fig. 2 is a detail view of a diffuser of Fig. 1; Fig. 3 is a modification of a supercharger; and Fig. 4 is a perspective view of a diffuser of Fig. 3 embodying my invention.

The arrangement in Figs. 1 and 2 comprises an internal combustion engine having a casing 10 and a crank shaft 11 supported by an antifriction bearing 12 on the casing 10. Other parts, such as cylinders, valves, etc., of the internal combustion engine 10 are not shown because they may be of conventional design and they do not form a part of my invention. A centrifugal compressor for supercharging the engine is secured to the engine and driven by the crank shaft thereof. This compressor or supercharger has a casing comprising two halves 13 and 14 fastened together by bolts 15. The two casing halves define an inlet conduit 16 for conducting a medium, such as air, to an impeller chamber 17 and a collector passage or scoll 18. An impeller 19 having a plurality of blades 20 is disposed in the impeller chamber and rotatably secured to and driven by a quill shaft 21. The quill shaft 21 carries a pinion 22 on its right-hand end which is driven from the crank shaft 11 through a shaft 23 projecting through the bore of the quill shaft and a gearing 24 including a gear 25 secured to the shaft 22, and a gear 26 meshing with the pinion 22.

A diffuser 27 is interposed between the impeller chamber and the collector chamber for converting the velocity energy imparted to the air or like medium by the rotating impeller into pressure energy. Thus, during operation, air or like medium is drawn through the inlet conduit 16 and by the action of the rotating impeller 19 the air is discharged at high velocity from the periphery of the impeller. The velocity energy then is converted into pressure energy by the diffuser 27. The compressed air or like medium contained in the collector passage or scroll 18 is discharged therefrom and conducted to the different cylinders of the combustion engine to be supercharged by a plurality of conduits 28 connected to the outer part of the collector passage 18 at points substantially uniformly spaced around the periphery of the collector.

An arrangement of this kind is more fully disclosed in the application to Sanford A. Moss, Serial No. 732,789, filed June 28, 1934, and assigned to the same assignee as the present invention.

The collector passage 18 is made comparatively small to keep the length of the engine, and consequently its weight down as much as possible. The discharge from the collector passage to the cylinders is non-uniform, the velocity of the air through the passage is relatively high and the direction of flow of air or like medium is not unidirectional but is suddenly and progressively reversed during short time intervals. In order to overcome the drawback of these conditions, and to facilitate the necessary reversals of flow and to secure an equal supply to each cylinder, I provide in accordance with my invention the special diffuser 27.

The diffuser, as best shown in Fig. 2, comprises a plurality of vanes or blades 29 shaped and arranged to form a plurality of expanding passages 30 uniformly spaced about a common axis for converting velocity energy of a medium flowing therethrough into pressure energy. The vanes are held in position by two side walls 31 and 32, which in the present instance are integrally cast therewith. The side walls have inner edges 33 and 34 which are circular in shape and engage shoulders 35 and 36 respectively formed on the corresponding casing halves 13 and 14. The diffuser 27 is secured to the casing and held in position on the shoulders 35, 36 formed thereon by a plurality of bolts 36a projecting through openings in the casing halves and in the vanes of the diffuser.

The outer edges or contours of the side walls, in accordance with my invention, are at least partly cut away intermediate the discharge edges 37 of adjacent vanes to form lateral openings for the discharge of fluid. In a preferred embodiment, as shown in the drawing, the outer edges or contours of the impeller side walls are saw-toothed, a saw-tooth 38 intermediate adjacent vanes being defined by an edge portion 39 starting at the top of a vane in substantially radial direction towards the center of the impeller, and another edge portion 40 starting at the intersection between the edge portion 39 and the contour of the adjacent vane and coinciding with the contour of the outer portion of such vane. The formation of the teeth may be accomplished in any desirable manner. In the present instance the teeth are formed initially during the casting of the side walls with the vanes. The toothed impeller portion projects centrally into the scroll or collecting chamber 18 of the compressor. The teeth form lateral channels for the fluid discharged from the diffuser, thereby reducing the resistance to flow of fluid from the diffuser into the collecting chamber, the fluid by this arrangement being discharged not only circumferentially from the diffuser but also laterally in both directions to the collecting passage. This provides additional paths for the reversals in flow described above, results in more uniform charge of the different engine cylinders connected to the collecting passage and less loss in pressure due to the reversals. In addition, the cut-away portions, the lateral openings or the saw-toothed formation of the diffuser side walls reduces the weight of the diffuser, an important item in modern airplane design.

The arrangement shown in Figs. 3 and 4 comprises a built-in supercharger for a combustion engine with a casing 45 and driven therefrom by means including a shaft 46 corresponding to the shaft 23 of Fig. 1, and a gear 47 corresponding to the gear 25 of Fig. 1. The supercharger or centrifugal compressor has a casing comprising two halves 48 and 49 fastened together by bolts 50. The casing forms an inlet conduit 51 leading to an impeller chamber 52, which latter communicates with a scroll or collecting chamber 53. An impeller 54 is rotatably disposed in the impeller chamber for forcing air from the inlet conduit 51 into the scroll 53. Velocity energy imparted to the air by the action of the impeller is converted into pressure energy by the provision of a diffuser 55 receiving air discharged from the impeller and disposed substantially entirely within the collecting passage 53. Whereas in the arrangement of Fig. 1 the diffuser is located centrally within the collecting passage 18, in the arrangement of Fig. 3 the diffuser 55 is disposed on one side of the scroll 53. The diffuser 55, as best shown in Fig. 4, has a plurality of vanes or guide blades 56 held together by a diffuser wall 57 corresponding to the wall 31 of Fig. 2. The outer portions of the wall 57 are cut away to form saw-teeth 58 corresponding to the teeth 38 of Fig. 1. The diffuser wall 57 has a shaped inward projection 59, which latter defines the right-hand side of the impeller chamber, the left-hand side of the impeller chamber being formed by the wall of the casing half 48. The diffuser is secured to the casing half 49 by means of bolts 60 projecting through openings 61 in the diffuser wall portion 59. During disassembly, the diffuser together with the casing half 49 may be dismantled from the compressor as a unit by the removal of the bolts 50. The collector passage 53 has a plurality of openings 62 connected to conduits 63 for conducting air or like compressed medium to the different cylinders of the combustion engine.

During operation, compressed fluid is discharged from the diffuser in radial or circumferential direction and also in lateral direction through the openings defined by the saw-teeth 58 into the scroll 53. This facilitates the reversals in flow described above and effects more uniform flow of air to the different cylinders of the engine. The arrangement, and particularly the diffuser, is simple in design and may be built at relatively low cost.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A centrifugal type supercharger for combustion engines comprising a casing defining an impeller chamber with an inlet conduit and a collector passage surrounding the impeller chamber and having outlet openings for discharging a compressed medium to a plurality of engine cylinders, an impeller rotatably disposed within the impeller chamber for forcing air radially outward, and a diffuser concentrically surrounding the impeller and secured to the casing for converting velocity energy of a medium impelled by the impeller into pressure energy, said diffuser including a plurality of vanes and a side wall secured thereto, said side wall having openings intermediate the outer end portions of the vanes to effect discharge of a medium from the diffuser in lateral direction as well as circumferentially outward.

2. A centrifugal type supercharger for internal combustion engines comprising an impeller chamber with an impeller rotatably disposed therein, a diffuser concentrically surrounding the impeller chamber for receiving a medium discharged from the impeller chamber and converting its velocity energy into pressure energy, and a collector passage for receiving compressed medium discharged from the diffuser, an outer part of the diffuser being disposed in the midst of the collector passage, the diffuser comprising a plurality of vanes and side walls secured thereto, said side walls having lateral openings intermediate the outer portions of the vanes to permit lateral as well as circumferential discharge of compressed medium from the diffuser.

3. A centrifugal type supercharger for combustion engines comprising a casing, an impeller chamber having a wall formed by the casing, an impeller rotatably disposed in the impeller chamber, a collector passage surrounding the impeller chamber for receiving fluid discharged therefrom and conducting it to different cylinders of a combustion engine, and a diffuser disposed at least partly within the passage for receiving medium forced radially outward by the impeller action and converting velocity energy of such medium into pressure energy, said diffuser having a saw-toothed side wall and a plurality of vanes with edges secured thereto, the free edges of the vanes contacting the casing wall whereby the latter forms a side wall for the diffuser.

4. A centrifugal type supercharger for combustion engines comprising a casing, an impeller chamber having a wall formed by the casing, an impeller rotatably disposed in the impeller chamber, a collector passage surrounding the impeller chamber for receiving fluid discharged therefrom and conducting it to different engine cylinders, a diffuser disposed at least partly within the passage for receiving medium forced outward by the impeller action and converting velocity energy of such medium into pressure energy, said diffuser having a side wall and a plurality of vanes with edges secured to the wall, the free edges of the vanes being close to the casing wall whereby the latter forms a side wall for the diffuser, and a curved projection integrally formed with the diffuser side wall to define a wall for the impeller chamber, the outer portion of the diffuser side wall being saw-toothed to permit lateral as well as circumferential discharge of compressed medium from the diffuser.

5. An article of manufacture for use in a centrifugal type compressor as a diffuser for converting velocity energy of a medium into pressure energy, such article comprising a plurality of vanes centrally disposed about a common axis and a side wall secured to the vanes to define a plurality of passages, said side wall forming lateral openings intermediate the outer portions of adjacent vanes to permit lateral discharge of a fluid flowing through the passages.

6. An article of manufacture for use in a centrifugal type compressor as a diffuser for converting velocity energy of a medium into pressure energy, said article comprising a plurality of vanes defining a plurality of nozzle passages, and a side wall secured to the vanes, the outer edge of the side wall being saw-toothed intermediate the outer portions of adjacent vanes to permit lateral discharge of a medium flowing through the passages.

SAMUEL R. PUFFER.